(12) United States Patent
Tran et al.

(10) Patent No.: US 6,711,301 B1
(45) Date of Patent: Mar. 23, 2004

(54) BLOCK-ORIENTED PIXEL FILTER

(75) Inventors: David Huu Tran, Los Altos, CA (US); Maximino Vasquez, Fremont, CA (US); Daniel Robert Joe, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/494,745

(22) Filed: Jan. 31, 2000

(51) Int. Cl.⁷ ............................. G06K 9/40; G06F 17/17
(52) U.S. Cl. ....................... 382/260; 382/261; 382/298; 708/313
(58) Field of Search ................................ 382/252, 254, 382/260–261, 298–299, 304, 307; 348/222.1, 581, 582, 704; 358/445, 448; 708/313

(56) References Cited

U.S. PATENT DOCUMENTS

| | | | |
|---|---|---|---|
| 4,382,254 A | 5/1983 | Ranalli | 340/744 |
| 4,853,766 A * | 8/1989 | Isnardi et al. | 375/240.25 |
| 4,862,403 A * | 8/1989 | Iwase et al. | 708/319 |
| 4,941,107 A | 7/1990 | Hasebe | 364/518 |
| 5,101,273 A * | 3/1992 | Gillies et al. | 348/441 |
| 5,113,455 A | 5/1992 | Scott | 382/47 |
| 5,469,517 A * | 11/1995 | Ohta | 382/252 |
| 5,838,387 A * | 11/1998 | Allen et al. | 348/581 |
| 6,249,549 B1 | 6/2001 | Kim | 375/240.21 |
| 6,320,619 B1 | 11/2001 | Jiang | 348/447 |
| 6,356,315 B1 * | 3/2002 | Chen et al. | 348/581 |

* cited by examiner

Primary Examiner—Daniel Mariam
(74) Attorney, Agent, or Firm—Thelen Reid & Priest LLP

(57) ABSTRACT

A method and apparatus for block-oriented pixel filtering reduces the number of hardware multipliers required for an image processing operation by increasing the speed of the pixel filter and rearranging the math operations. A sorter is employed in the line buffers so that defined groups of input pixel components are provided to the multipliers of the pixel filter. An accumulator is employed to receive products from the multipliers and assemble output pixels. The savings in gate count from reducing the number of multipliers is greater than additional costs, if any, of the sorter and other logic. The method and apparatus of the invention also simplify the addressing logic for the provision of scaling coefficients during an image processing operation.

25 Claims, 10 Drawing Sheets

BLOCK-ORIENTED PIXEL FILTER

BACKGROUND OF THE INVENTION

1. Field of the Invention

The present invention relates to the processing of video images. More particularly, the present invention relates to an apparatus and method for reducing the number of hardware multipliers and simplifying the addressing logic for video processing operations.

2. Background

Computer and video displays are made up of a series of frames that are sequentially displayed on a monitor. While one frame is being displayed, the next frame is assembled and stored in a memory called the frame buffer. The frequency of changing the displayed frames, i.e. the frame cycle, is controlled by a clock known as a dot clock.

Each frame is made up of a number of pixels and each pixel may be composed of several color space components. To assemble a frame of pixels, the frame buffer must be refilled within each frame cycle. Therefore, when processing digital signals for real-time display, the value of every color space component in each pixel comprising a frame must be obtained within a frame cycle. To this end, one pixel is added to the frame buffer in each cycle of the dot clock. For example, in a 1024 by 768 display there will be 786,432 dot clock cycles per frame cycle.

Scaling involves transforming an input frame to an output frame by changing the effective display resolution, and therefore changing the number of pixels from the input frame to the output frame. Superior output image quality is best obtained by using an algorithm which uses interpolation to calculate the value of the pixels in the output frame. This is typically accomplished in a structure called a pixel filter, which combines data from several pixels of the input frame into each pixel of the output frame.

The basic finite impulse response (FIR) algorithm is:

$$\text{Out}(j) = \text{Sum} [\text{Coeff}(i) * \text{In}(i,j)], i=0,1 \ldots n-1$$

where Coeff(i) is the filter tap coefficient corresponding to filter tap i, and n is the number of filter taps. The algorithm is used to calculate each color space component of each pixel in the output frame.

In a typical image processing operation, the value of the pixels in an output frame are calculated in a pixel-oriented approach. For example, if a three-tap filter is used, the pixel filter will require the parallel input of the three pixels from the input frame corresponding to the three filter taps. Then, the filter will use the FIR algorithm to calculate the value of the pixel for the output frame in a single cycle of the filter clock which controls the pixel filter. If there are multiple color space components in each pixel, all of the color space components for each pixel in an output frame will be processed in parallel.

The speed of the pixel filter is controlled by a filter clock. In the pixel-oriented approach, the filter clock runs at the same speed as the dot clock. Therefore, a pixel for the output frame is produced by the pixel filter at each cycle of the filter clock, and a (different) pixel is added to the output frame buffer at each cycle of the dot clock.

The pixel-oriented approach requires sufficient hardware to produce a pixel in each cycle of the filter clock. Generally, this means that x times n multipliers are required, where x equals the number of color space components per pixel and n equals the number of filter taps in the filter. Since the most expensive hardware (in terms of gate count) required by pixel filters are multipliers, it would be desirable to reduce the number of hardware multipliers needed for a given scaling operation.

The pixel-oriented approach requires that all scaling coefficients required by the FIR algorithm be provided at each cycle of the filter clock. Therefore, it would also be desirable to simplify the addressing logic for the provision of scaling coefficients during a scaling operation.

BRIEF DESCRIPTION OF THE INVENTION

A method and apparatus for block-oriented pixel filtering reduces the number of hardware multipliers required for an image processing operation by increasing the speed of the pixel filter and rearranging the math operations. A sorter is employed in the line buffers so that defined groups of input pixel components are provided to the multipliers of the pixel filter. An accumulator is employed to receive products from the multipliers and assemble output pixels. The savings in gate count from reducing the number of multipliers is greater than additional costs, if any, of the sorter and other logic. The method and apparatus of the invention also simplify the addressing logic for the provision of scaling coefficients during an image processing operation.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
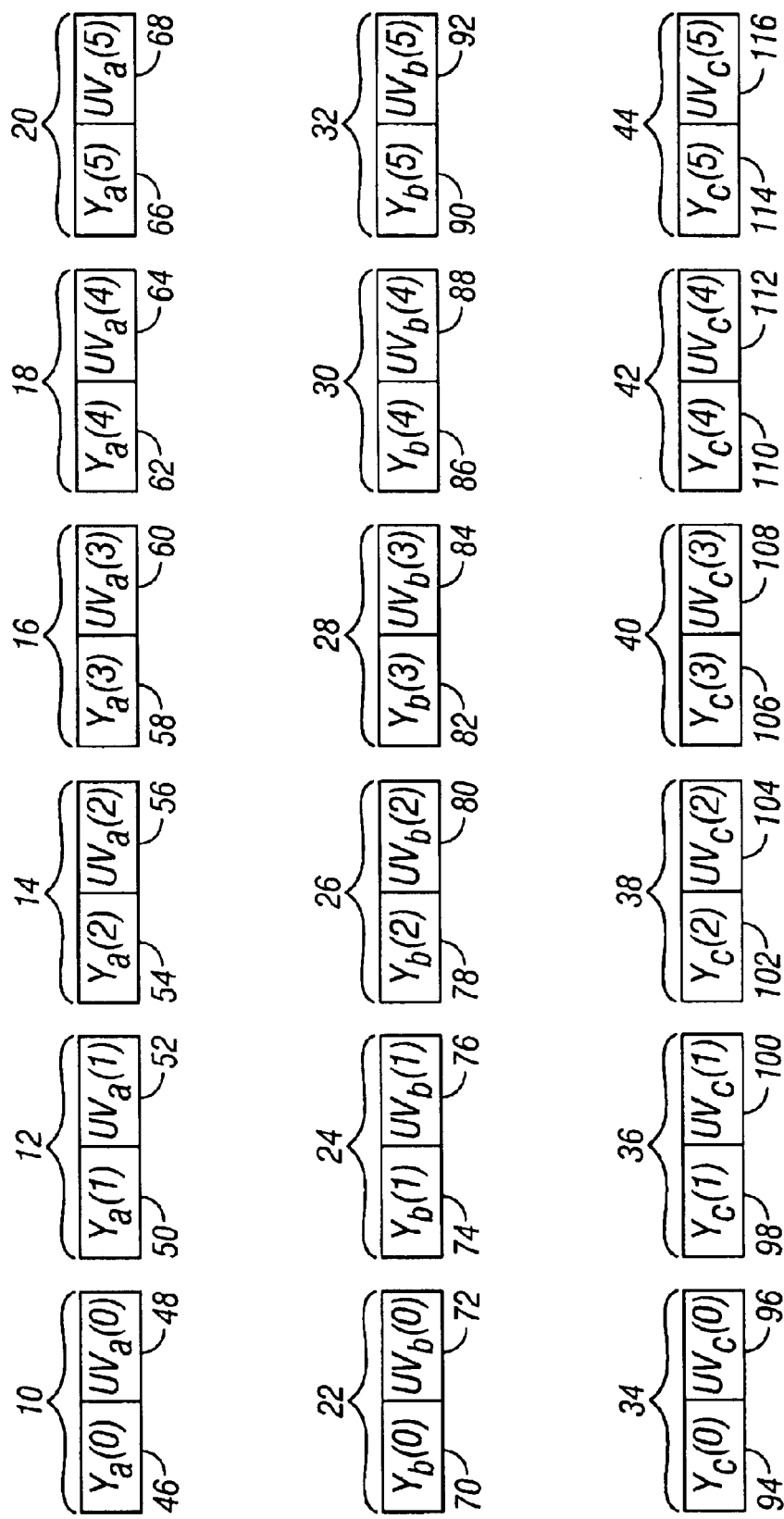
FIG. 1 is a block diagram showing an example of a portion of an input frame for processing by a pixel filter in accordance with both the prior art and a specific embodiment of the present invention.
Figure 2:
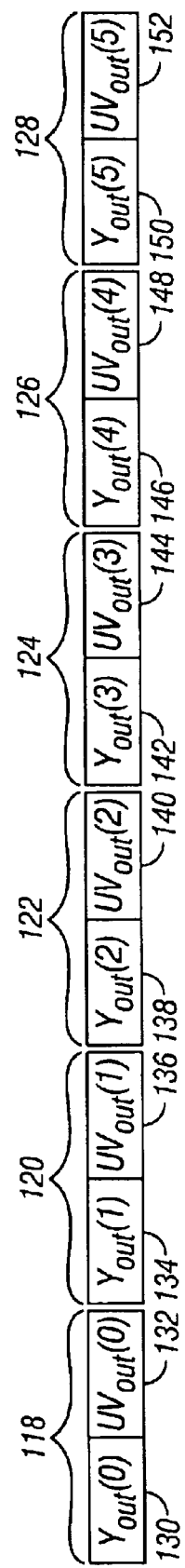
FIG. 2 is a block diagram showing an example of output pixels from a pixel filter in accordance with both the prior art and a specific embodiment of the present invention.

FIG. 1 is a block diagram showing an example of a portion of an input frame for processing by a pixel filter in accordance with both the prior art and a specific embodiment of the present invention and FIG. 2 is a block diagram showing an example of output pixels from a pixel filter in accordance with both the prior art and a specific embodiment of the present invention.

FIG. 1 represents a group of 18 input pixels from an input frame which is to be processed into an output frame. FIG. 2 represents a group of six output pixels from a 3-tap pixel filter which used the 18 input pixels in FIG. 1 as input. The output pixels comprise a portion of an output frame. Each input pixel and each output pixel is composed of two color space components, or pixel components. For example, input pixel 10 from FIG. 1 is composed of input pixel components Ya(0) (46) and UVa(0) (48). Likewise, output pixel 118 from FIG. 2 is composed of output pixel components Yout(0) (130) and UVout(0) (132).

Output pixels are derived from sets of input pixels by applying the FIR algorithm. Output pixel 118, for example, is derived from the input pixel set composed of input pixels 10, 22 and 34. More specifically, output pixel component Yout(0) (130) is derived from input pixel components Ya(0) (46), Yb(0) (70) and Yc(0) (94) and output pixel component UVout(0) is derived from input pixel components UVa(0) (48), UVb(0) (72) and UVc(0) (96). Generally, a "set of input pixels" refers to the specific input pixels which are used to produce an output pixel. Thus, for an n-tap pixel filter, there will be n input pixels in each set of input pixels and each input pixel in the set will correspond to a filter tap.

By convention, each pixel component is named in three parts. The first part represents the color space component (e.g., Y or UV). For input pixel components, the second part indicates the corresponding filter tap (e.g., 0, 1 or 2 for a three tap filter). For output pixel components, the second part indicates "out" for output. The third part of the name indicates the set of input pixels which the input pixel component belongs to or, for output pixel components, the input pixel set from which the output pixel component is derived.

Figure 3:
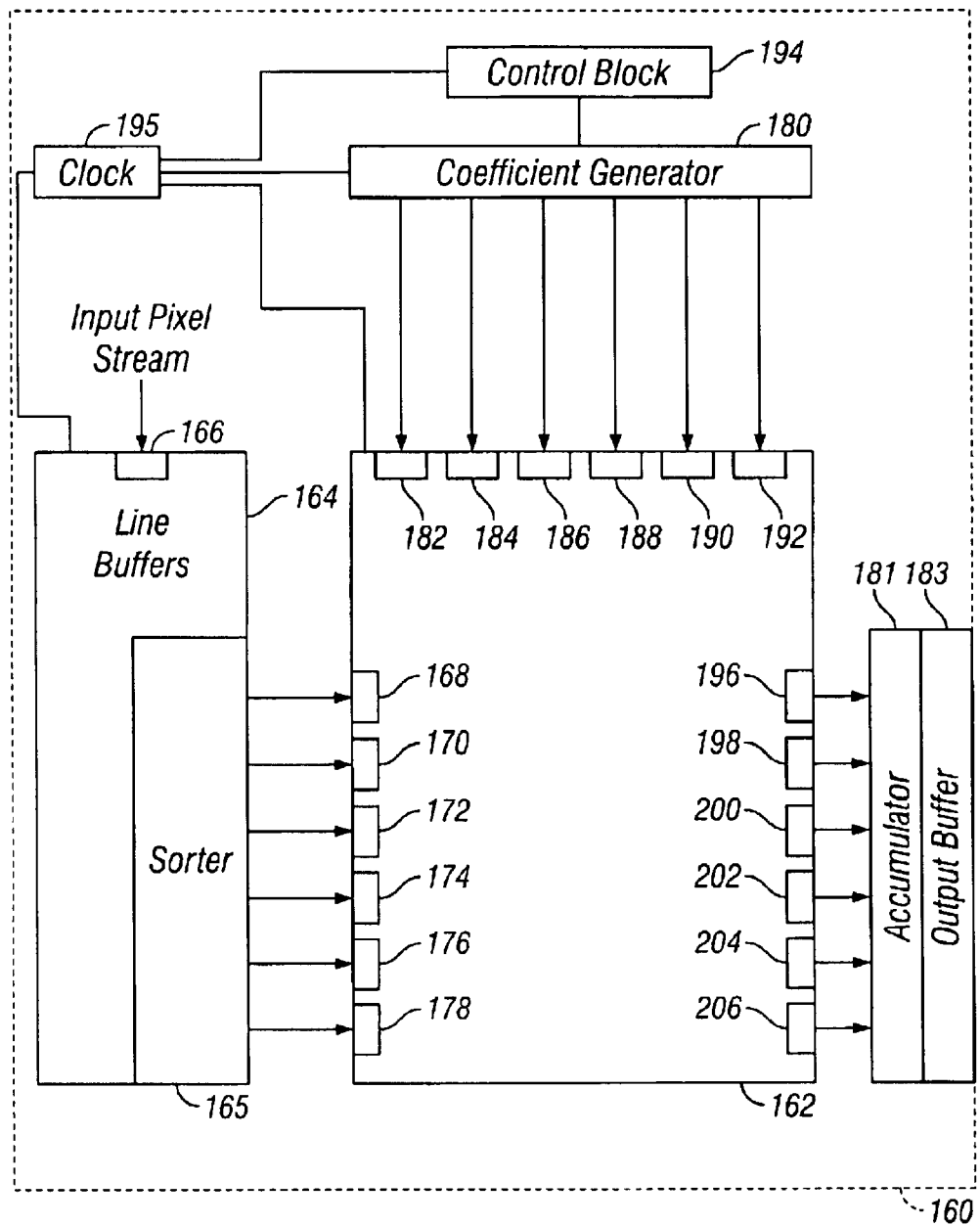
FIG. 3 is a block diagram showing the orientation of the functional components of a pixel filter in accordance with a specific embodiment of the present invention.

FIG. 3 is a block diagram showing the orientation of the functional components of a pixel filter in accordance with a specific embodiment of the present invention. The pixel filter (160) has a plurality of multipliers (162), which are not shown individually. The input pixel stream enters the line buffers (164) at 166. The line buffers (164) then simultaneously provide groups of input pixel components which are received by the multipliers (162) via multiplier input ports (168, 170, 172, 174, 176, 178). A sorter (165) in the line buffers arranges the groups of input pixel components in accordance with the invention. The multipliers also receive scaling coefficients from the coefficient generator (180) at 182, 184, 186, 188, 190 and 192. A control block (194) directs the coefficient generator (180) to generate the appropriate scaling coefficients. After the multipliers have multiplied each input pixel component by the appropriate scaling coefficient, the products are output at 196, 198, 200, 202, 204, and 206 for further processing by an accumulator (181) and an output buffer (183) or device as described below. The pixel filter (160) also includes a clock (195) which is connected to the components within the pixel filter. The clock defines a series of cycles of uniform periodicity.

Figure 4:
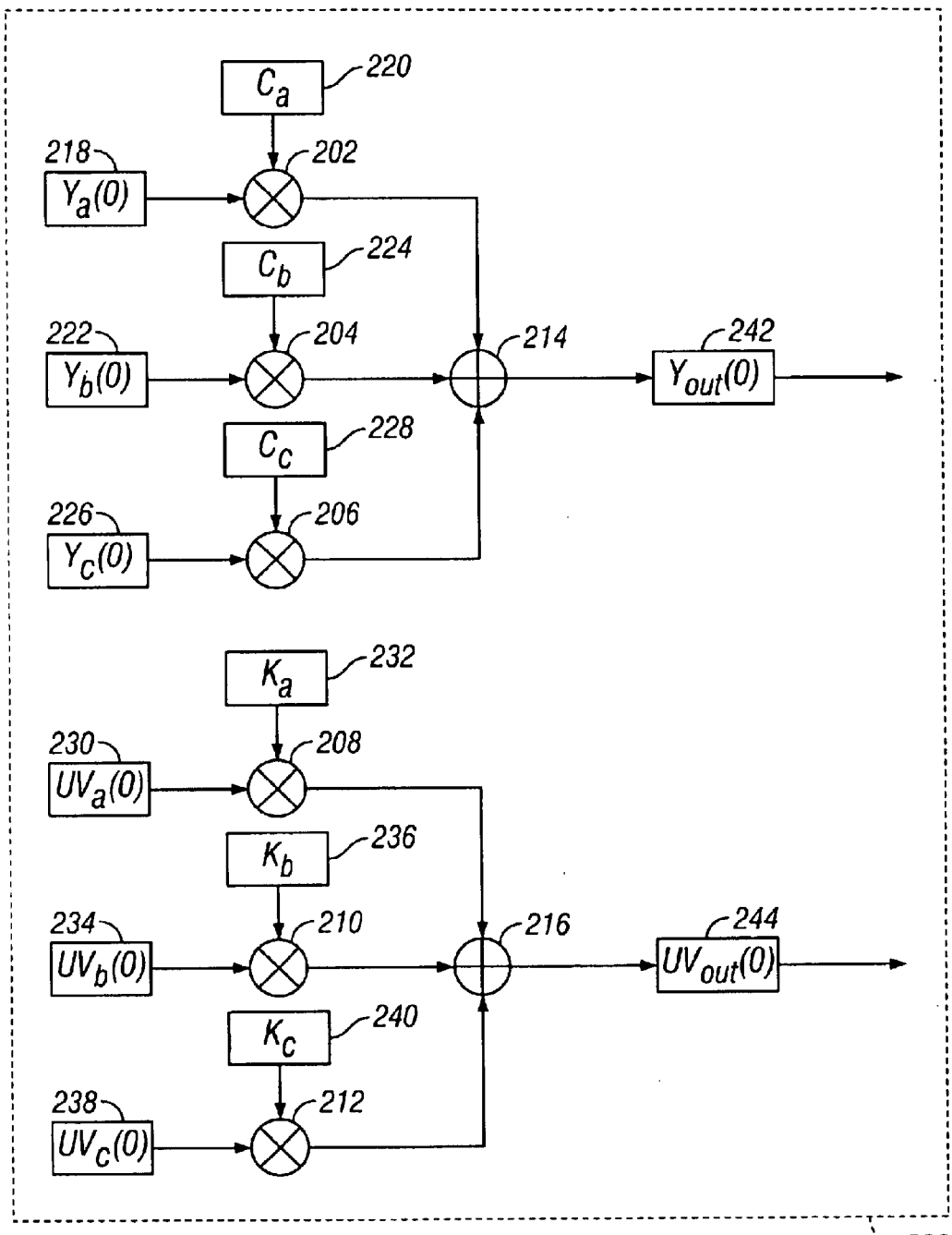
FIG. 4 is a block diagram showing the orientation of the multipliers and adders of a pixel filter in accordance with the prior art.

FIG. 4 is a block diagram showing the orientation of the multipliers and adders of a pixel filter in accordance with the prior art. The diagram illustrates processing a pixel in the prior art pixel-oriented method according to clock 0 of table 1.

TABLE 1

| Clock | 0 | 1 | 2 | 3 | 4 | 5 |
|---|---|---|---|---|---|---|
| Mult 0 | Ca * Ya(0) | Ca * Ya(1) | Ca * Ya(2) | Ca * Ya(3) | Ca * Ya(4) | Ca * Ya(5) |
| Mult 1 | Cb * Yb(0) | Cb * Yb(1) | Cb * Yb(2) | Cb * Yb(3) | Cb * Yb(4) | Cb * Yb(5) |
| Mult 2 | Cc * Yc(0) | Cc * Yc(1) | Cc * Yc(2) | Cc * Yc(3) | Cc * Yc(4) | Cc * Yc(5) |
| Mult 3 | Ka * UVa(0) | Ka * UVa(1) | Ka * UVa(2) | Ka * UVa(3) | Ka * UVa(4) | Ka * UVa(5) |
| Mult 4 | Kb * UVb(0) | Kb * UVb(1) | Kb * UVb(2) | Kb * UVb(3) | Kb * UVb(4) | Kb * UVb(5) |
| Mult 5 | Kc * UVc(0) | Kc * UVc(1) | Kc * UVc(2) | Kc * UVc(3) | Kc * UVc(4) | Kc * UVc(5) |
| Output | Yout(0) UVout(0) | Yout(1) UVout(1) | Yout(2) UVout(2) | Yout(3) UVout(3) | Yout(4) UVout(4) | Yout(5) UVout(5) |

Pixel filter 200 has six multipliers 202, 204, 206, 208, 210, 212 and two adders 214, 216. During filter clock 0, multiplier 202 receives input pixel component 218 and scaling coefficient 220. Also during filter clock 0, the other multipliers 204, 206, 208, 210, 212 receive input pixel components and scaling coefficients according to Table 1. During filter clock 0, the multipliers produce their respective products and the adders (214, 216) add the products according to the FIR algorithm. As a result, an entire output pixel comprising output pixel components 242 and 244 is produced in one cycle of the filter clock. A pixel-oriented pixel filter continues to produce one entire output pixel for each filter clock cycle, as described in Table 1.

The block-oriented pixel filter of the present invention does not produce one entire output pixel for each filter clock cycle. Instead, the block-oriented pixel filter produces blocks of output pixels or blocks of output pixel components periodically, depending upon the organization of the filter. In some instances, an output block may comprise a single output pixel, or even a single output pixel component.

Figure 5:
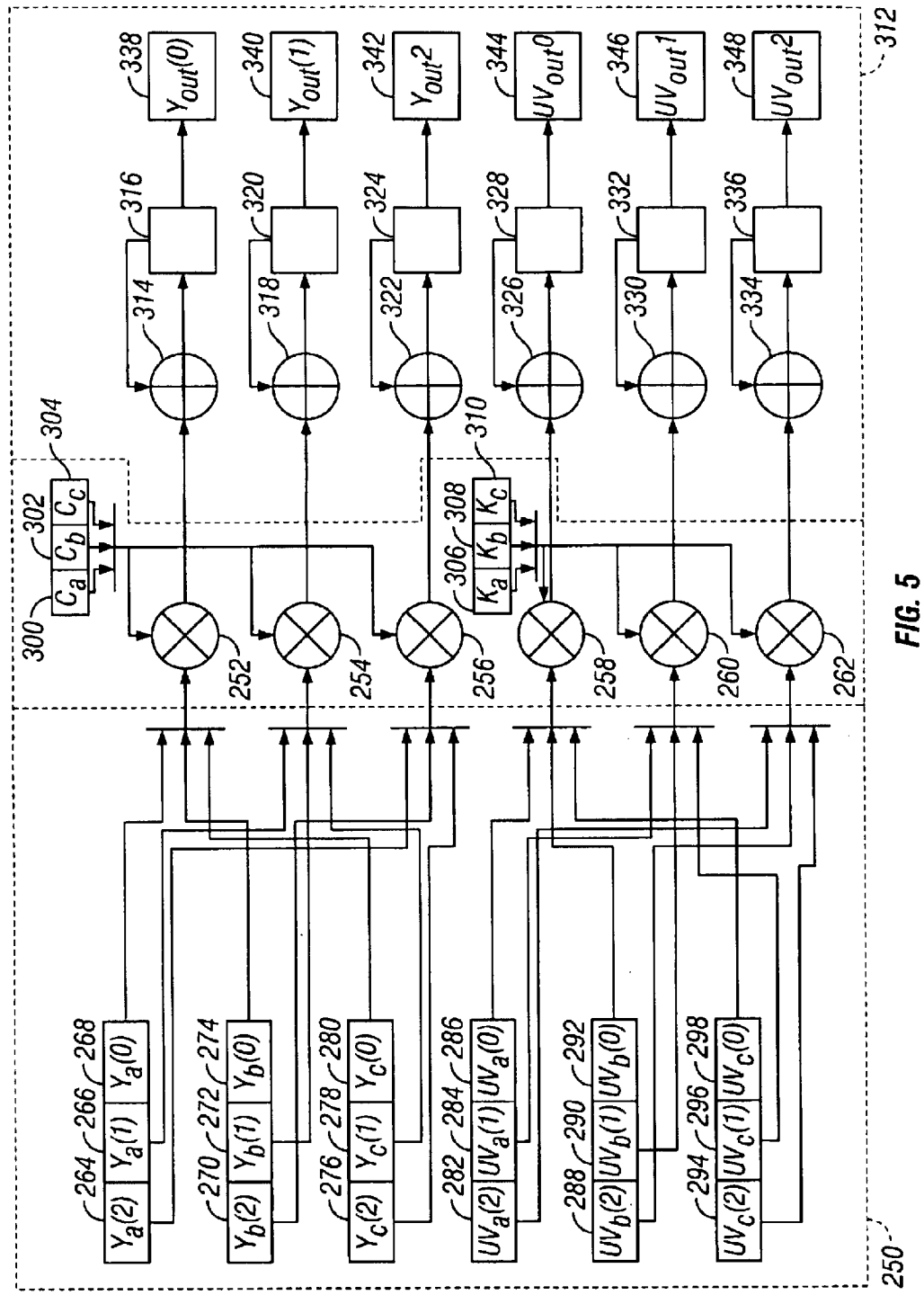
FIG. 5 is a block diagram showing the orientation of the sorter, multipliers and accumulator of a pixel filter in accordance with a specific embodiment of the present invention.

FIG. 5 is a block diagram showing the orientation of the sorter, multipliers and accumulator of a block-oriented pixel filter in accordance with a specific embodiment of the present invention. The diagram illustrates the block-oriented pixel filtering method according to clocks 0–2 of Table 2.

TABLE 2

| Clock | 0 | 1 | 2 | 3 | 4 | 5 |
|---|---|---|---|---|---|---|
| Mult 0 | Ca * Ya(0) | Cb * Yb(0) | Cc * Yc(0) | Ca * Ya(3) | Cb * Yb(3) | Cc * Yc(3) |
| Mult 1 | Ca * Ya(1) | Cb * Yb(1) | Cc * Yc(1) | Ca * Ya(4) | Cb * Yb(4) | Cc * Yc(4) |
| Mult 2 | Ca * Ya(2) | Cb * Yb(2) | Cc * Yc(2) | Ca * Ya(5) | Cb * Yb(5) | Cc * Yc(5) |

TABLE 2-continued

| Clock | 0 | 1 | 2 | 3 | 4 | 5 |
|---|---|---|---|---|---|---|
| Mult 3 | Ka * UVa(0) | Kb * UVb(0) | Kc * UVc(0) | Ka * UVa(3) | Kb * UVb(3) | Kc * UVc(3) |
| Mult 4 | Ka * UVa(1) | Kb * UVb(1) | Kc * UVc(1) | Ka * UVa(4) | Kb * UVb(4) | Kc * UVc(4) |
| Mult 5 | Ka * UVa(2) | Kb * UVb(2) | Kc * UVc(2) | Ka * UVa(5) | Kb * UVb(5) | Kc * UVc(5) |
| Output | | | Yout(0) | | | Yout(3) |
| | | | Yout(1) | | | Yout(4) |
| | | | Yout(2) | | | Yout(5) |
| | | | UVout(0) | | | UVout(3) |
| | | | UVout(1) | | | UVout(4) |
| | | | UVout(2) | | | UVout(5) |

In the block-oriented approach, the line buffers of the pixel filter contains a sorter (250) which receives the input frame and sequentially provides groups of input pixel components to the multipliers (252, 254, 256, 258, 260. 262), where the groups of input pixel components do not comprise sets of input pixels.

For example, at clock 0 of Table 2 the sorter (250) provides input pixel components Ya(0) (268), Ya(1) (266), Ya(2) (264), UVa(0) (286), UVa(1) (284) and UVa(2) (282) to the multipliers as shown. Multipliers (252, 254, 256) receive scaling coefficient Ca (300) from the coefficient generator and multipliers (258, 260, 262) receive scaling coefficient Ka (306) from the coefficient generator. The products produced by the multipliers at clock 0 cannot usefully be combined with each other according to the FIR algorithm, so the products produced during clock 0 are stored separately in an accumulator (312).

In the embodiment shown, the accumulator comprises a plurality of pairs of adders (314, 318, 322, 326, 330, 334) and holding registers (316, 320, 324, 328, 332, 336). The adders perform the additions required by the FIR algorithm. The holding registers store values and provide them to the adders as required by the FIR algorithm. After clock 0 in this example, holding register 316 stores the product of input pixel Ya(0) (268) and scaling coefficient Ca (300), holding register 320 stores the product of input pixel Ya(1) (266) and scaling coefficient Ca (300), holding register 324 stores the product of input pixel Ya(2) (264) and scaling coefficient Ca (300), holding register 328 stores the product of input pixel UVa(0) (286) and scaling coefficient Ka (306), holding register 332 stores the product of input pixel UVa(1) (284) and scaling coefficient Ka (306), and holding register 336 stores the product of input pixel UVa(2) (282) and scaling coefficient Ka (306).

At clock 1 of Table 2 the sorter (250) provides input pixel components Yb(0) (274), Yb(1) (272), Yb(2) (270), UVb(0) (292), UVb(1) (290) and UVb(2) (288) to the multipliers as shown. Multipliers (252, 254, 256) receive scaling coefficient Cb (302) from the coefficient generator and multipliers (258, 260, 262) receive scaling coefficient Kb (308) from the coefficient generator. Again, the products produced by the multipliers at clock 1 cannot usefully be combined with each other according to the FIR algorithm. Instead, the product of mutiplier 252 is added to the value in holding register 316 by adder 314, and the result is stored back in holding register 316. The other multipliers, adders, and accumulators perform similarly. Still, at clock 1, no entire output pixel has been produced. At clock 2 of Table 2 the sorter (250) provides input pixel components Yc(0) (280), Yc(1) (278), Yc(2) (276), UVc(0) (298), UVc(1) (296) and UVc(2) (294) to the multipliers as shown. Multipliers (252, 254, 256) receive scaling coefficient Cc (304) from the coefficient generator and multipliers (258, 260, 262) receive scaling coefficient Kc (310) from the coefficient generator. The products produced by the multipliers at clock 2 are then added to the values in the holding registers by the adders, as at clock 1. After the additions, six completed output pixel components (338, 340, 342, 344, 346, 348) representing a block of three output pixels have been produced at clock 2. The output pixel components in the accumulator (312) are then provided to an output buffer or a memory, as described below, and the holding registers are cleared. The pixel filter continues processing groups of input pixel components, as exemplified in Table 2.

In the example in Table 2, only two scaling coefficients need be provided during each clock cycle, illustrating the simplification of the addressing logic for the provision of scaling coefficients during a scaling operation. Further, if the number of multipliers for this scaling operation is reduced to three and the multiplication order rearranged by using the approach of speeding up the filter clock as described below, only a single scaling coefficient need be provided per filter clock cycle.

Figure 6:
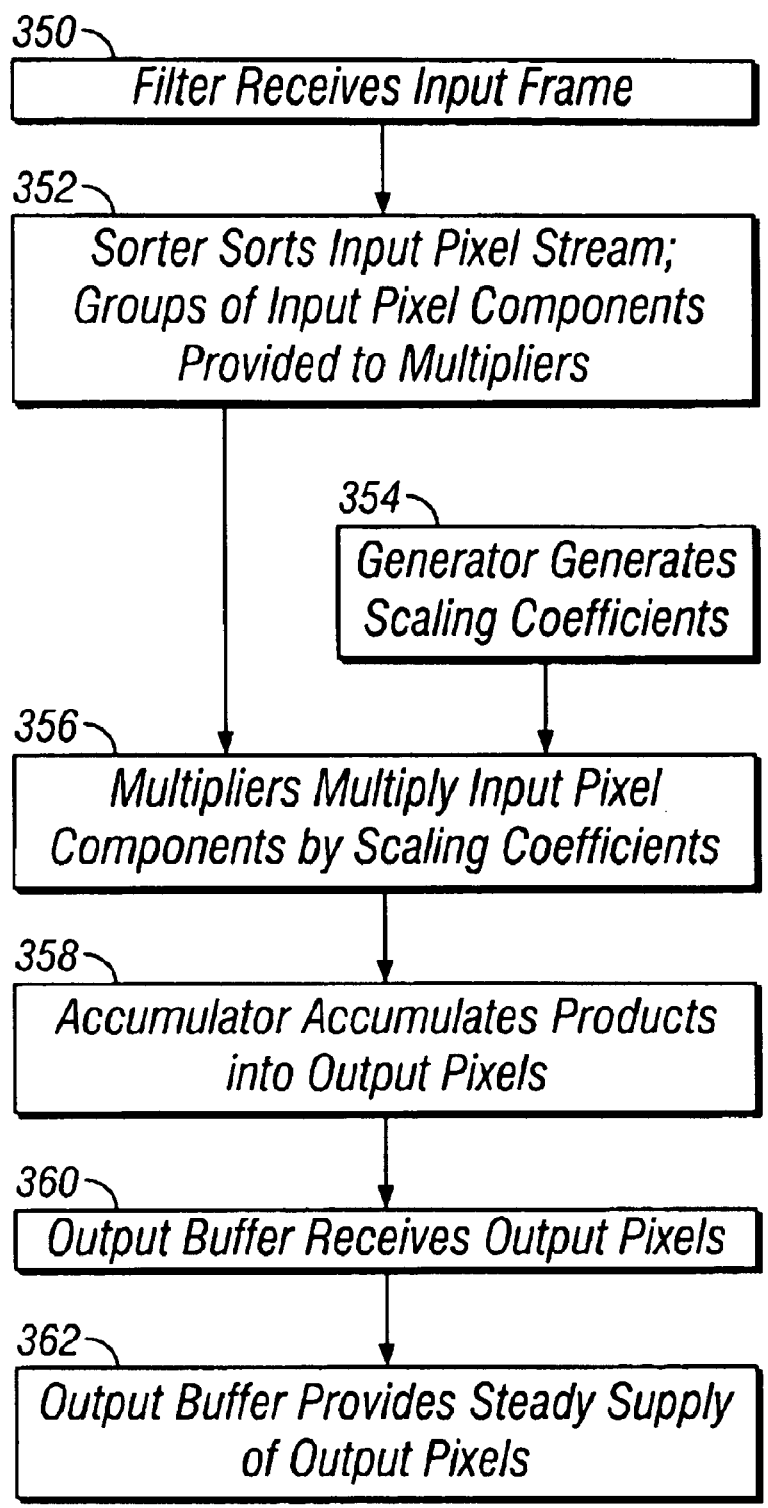
FIG. 6 is a process flow diagram showing the operating steps of a block-oriented pixel filter in accordance with a specific embodiment of the present invention.

FIG. 6 is a process flow diagram showing the operating steps of a block-oriented pixel filter in accordance with a specific embodiment of the present invention. The process begins by the sorter receiving an input frame (350). The sorter then sorts the input frame into groups of input filter components and provides the groups of input pixel components to the multipliers during each clock cycle (352). During the same clock cycle, a coefficient generator generates scaling coefficients (354) which are received by the multipliers along with groups of input pixel components. Also during the same clock cycle, the multipliers multiply each pixel component in the groups of input pixel components by the appropriate scaling coefficient in parallel, thereby producing products (356). The products of the multiplication operations are accumulated in an accumulator (358) into output pixels. Then, the output pixels are received into an output buffer (360) from where they provide a steady supply of output pixels for assembly into frames (362).

In the method described in FIG. 6, there are three essential variations on the theme of block-oriented pixel filtering. In one variation, the number of coefficients provided during each clock cycle is less than the number of filter taps times the number of input pixel components in an input pixel. In another variation, the number of input pixel components provided during each clock cycle is less than the number of filter taps times the number of input pixel components in an input pixel. In the third variation, both the number of coefficients provided during each clock cycle and the number of input pixel components provided during each clock cycle are less than the number of filter taps times the number of input pixel components in an input pixel.

Figure 7:
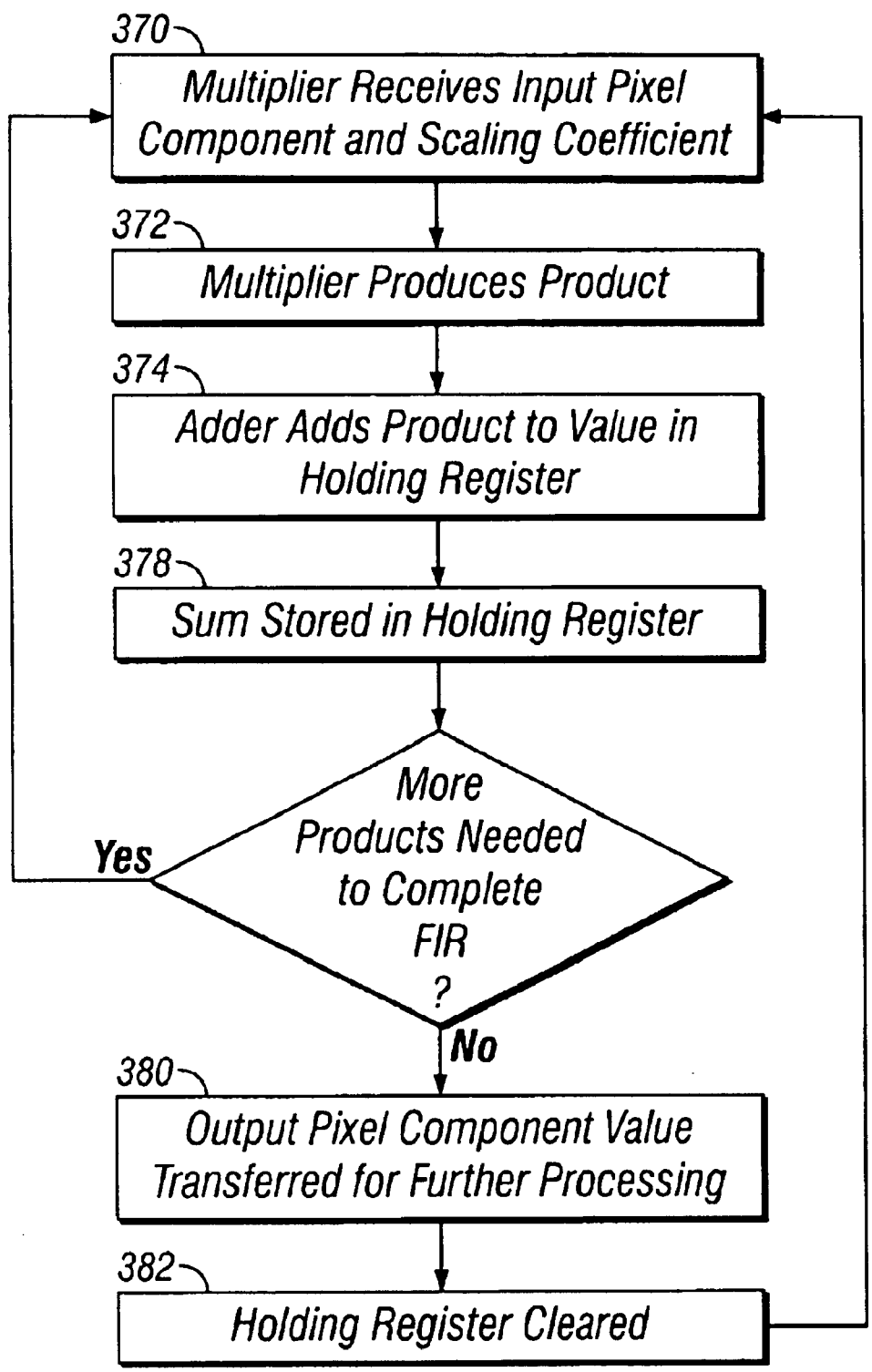
FIG. 7 is a process flow diagram showing the operating steps of a single multiplier and accumulator in a block-oriented pixel filter in accordance with a specific embodiment of the present invention.

FIG. 7 is a process flow diagram showing the operating steps of a single multiplier and accumulator producing an output pixel component in a block-oriented pixel filter in accordance with a specific embodiment of the present invention. In the embodiment described, the accumulator comprises an adder and a holding register. Initially, the holding register is clear. The multiplier then receives a scaling coefficient and an input pixel component (370). The multiplier performs the multiplication and produces a product (372). The product is then added to the value in the holding register by the adder (374) and the sum is stored in the holding register (378). If more products are needed to complete the FIR algorithm, steps 370 to 378 are repeated. When all products necessary to complete the FIR algorithm have been accumulated in the holding register, the value in the holding register represents the value of an output pixel component and the value is transferred on for further processing (380). Then, the holding register is cleared (382) and the process repeats beginning at step 370. Providing extra logic may allow some of these steps to be omitted. For example, adding the first product to a zero value in the holding register is unnecessary. Storing the completed output pixel component in the holding register from the adder before transfer for further processing is also unnecessary.

The present invention may be implemented for a pixel filter having any number of filter taps by changing the number of multipliers as well as modifying the sorter and the accumulator. However, it will be appreciated that, for a block-oriented pixel filter having any number of filter taps, the functions of the sorter, multipliers and accumulator will be essentially the same. The sorter receives the input pixel stream and sequentially provides groups of input pixel components, where the groups of input pixel components do not comprise sets of input pixels. The multipliers receive the scaling coefficients and the input pixel components and provide products. The accumulator receives the products from the multipliers and provides output pixels.

The examples in tables 3–7 exemplify a four-tap filter.

TABLE 3

| Filter Clock | 1 | 2 | 3 |
|---|---|---|---|
| Mult 0 | Ca * Ya(0) | Ca * Ya(1) | Ca * Ya(2) |
| Mult 1 | Cb * Yb(0) | Cb * Yb(1) | Cb * Yb(2) |
| Mult 2 | Cc * Yc(0) | Cc * Yc(1) | Cc * Yc(2) |
| Mult 3 | Cd * Yd(0) | Cd * Yd(1) | Cd * Yd(2) |
| Mult 4 | Ka * UVa(0) | Ka * UVa(1) | Ka * UVa(2) |
| Mult 5 | Kb * UVb(0) | Kb * UVb(1) | Kb * UVb(2) |
| Mult 6 | Kc * UVc(0) | Kc * UVc(1) | Kc * UVc(2) |
| Mult 7 | Kd * UVd(0) | Kd * UVd(1) | Kd * UVd(2) |
| Output | Yout(0) UVout(0) | Yout(1) UVout(1) | Yout(2) UVout(2) |

Table 3 demonstrates producing three output pixels from 12 input pixels, each having two color space components, using a four-tap filter and a pixel-oriented approach. It can be seen that the pixel-oriented approach requires eight multipliers and will complete the production of the three output pixels in three cycles of the filter clock. As always in the pixel-oriented approach, an entire output pixel is produced at each cycle of the filter clock.

Since there are finite requirements to produce an acceptable visual output, it is possible to increase the speed of the filter clock beyond that of the pixel clock. For example, if a 1024 by 768 display shows 70 frames per second, the visual output screen needs to be provided with about 75 million pixels per second by the pixel filter. In the pixel-oriented approach, the filter clock has to run at a minimum speed of at least 75 Mhz. If pixel filter processing speed in excess of the minimum is available, gate count may be reduced by increasing the speed of the filter clock. This major advantage of the block-oriented approach is demonstrated by table 4.

TABLE 4

| Filter Clock | 0 | 1 | 2 | 3 |
|---|---|---|---|---|
| Mult 0 | Ca * Ya(0) | Cb * Yb(0) | Cc * Yc(0) | Cd * Yd(0) |
| Mult 1 | Ca * Ya(1) | Cb * Yb(1) | Cc * Yc(1) | Cd * Yd(1) |
| Mult 2 | Ca * Ya(2) | Cb * Yb(2) | Cc * Yc(2) | Cd * Yd(2) |
| Mult 3 | Ka * UVa(0) | Kb * UVb(0) | Kc * UVc(0) | Kd * UVd(0) |
| Mult 4 | Ka * UVa(1) | Kb * UVb(1) | Kc * UVc(1) | Kd * UVd(1) |
| Mult 5 | Ka * UVa(2) | Kb * UVb(2) | Kc * UVc(2) | Kd * UVd(2) |
| Output | | | | Yout(0) UVout(0) Yout(1) UVout(1) Yout(2) UVout(2) |

In the example shown in table 4, the same 12 input pixels of table 3 are processed in the block-oriented method of the present invention. By speeding up the filter clock by 33%, the number of required multipliers are reduced from eight to six while producing the same three pixels in the same elapsed time. This is a significant advantage, because hardware multipliers are relatively expensive in terms of gate count. Even if registers and multiplexers are used for the sorter, accumulator, and output buffer as described below, the reduction in multipliers will result in lower overall gate count. Further, if sorting and bufferring is combined with other existing logic, additional savings in gate count may be accomplished.

Implementation of the accumulator for the operations described in table 4 will be similar to that shown in FIG. 5. The accumulator will comprise a plurality of adders where the number of adders is equal to the number of multipliers in the pixel filter.

Since each multiplier requires a multiplier input port, table 4 demonstrates that the number of multiplier input ports from the input buffer may be reduced by using this invention, because fewer input pixel components are processed at each clock. This is also illustrated by the examples in tables 5, 6 and 7.

Another advantage demonstrated by table 4 is simpler addressing logic for scaling coefficients. Even when two or more coefficients are needed per filter clock cycle, as shown, the logic may be simpler than providing all scaling coefficients for every filter clock cycle. The logic may be further simplified when a single scaling coefficient corresponding to a single input pixel component position is used by all multipliers in a filter clock cycle.

TABLE 5

| Filter Clock | 0 | 1 | 2 | 3 | 4 | 5 |
|---|---|---|---|---|---|---|
| Mult 0 | Ca * Ya(0) | Cb * Yb(0) | Cc * Yc(0) | Cd * Yd(0) | Ka * UVa(1) | Ka * UVa(2) |
| Mult 1 | Ca * Ya(1) | Cb * Yb(1) | Cc * Yc(1) | Cc * Yd(1) | Kb * UVb(1) | Kb * UVb(2) |
| Mult 2 | Ca * Ya(2) | Cb * Yb(2) | Cc * Yc(2) | Cd * Yd(2) | Kc * UVc(1) | Kc * UVc(2) |
| Mult 3 | Ka * UVa(0) | Kb * UVb(0) | Kc * UVc(0) | Kd * UVd(0) | Kd * UVd(1) | Kd * UVd(2) |
| Output | | | | Yout(0) | UVout(1) | UVout(2) |

TABLE 5-continued

| Filter Clock | 0 | 1 | 2 | 3 | 4 | 5 |
|---|---|---|---|---|---|---|
| | | | | UVout(0) Yout(1) Yout(2) | | |

The example shown in table 5 further illustrates the advantage of speeding up the filter clock. Here, by having the filter clock run twice as fast as the pixel clock, the number of multipliers are reduced from eight to four when producing three output pixels from 12 input pixels, each having two color space components, using a four-tap filter.

Figure 8:
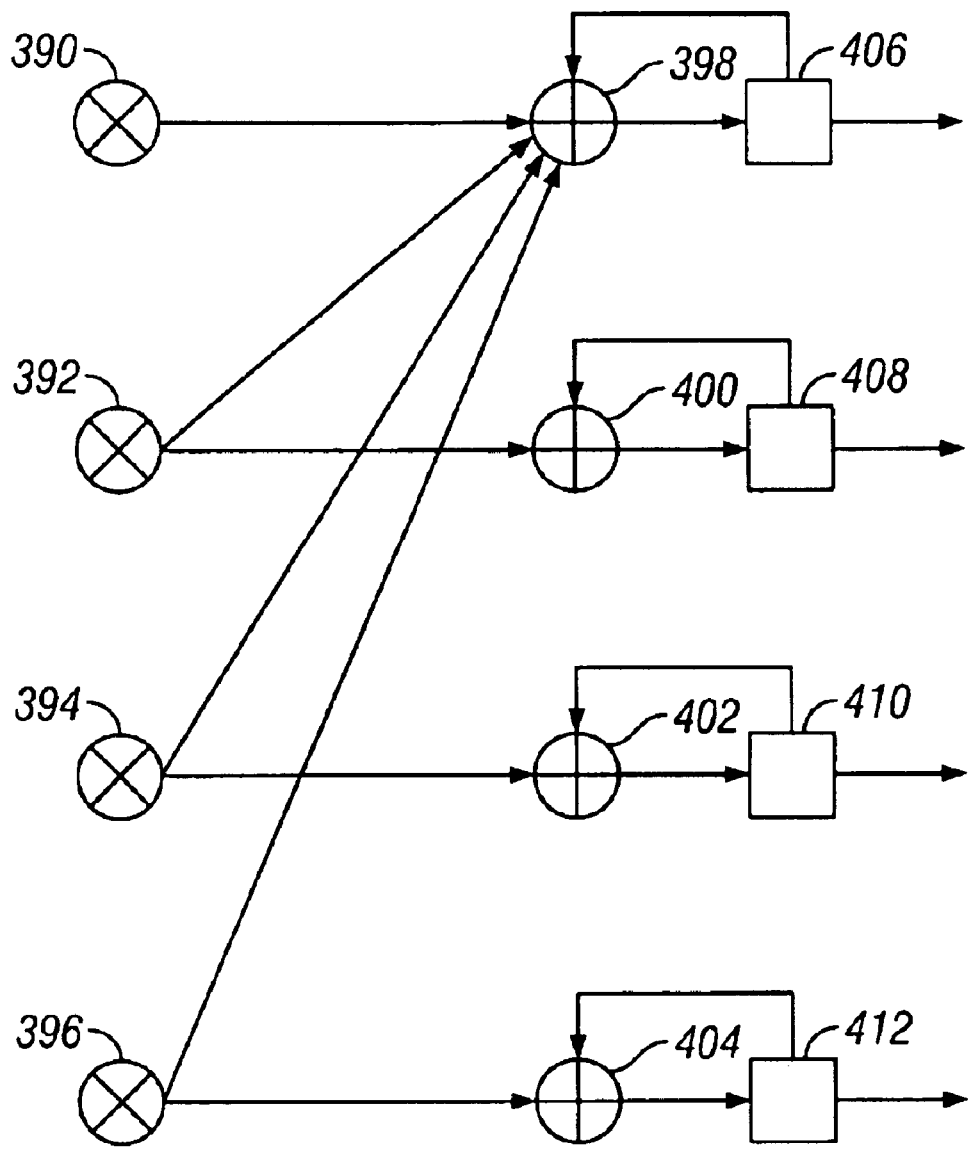
FIG. 8 is a block diagram showing the organization of the functional components in an implementation of an accumulator in accordance with a specific embodiment of the present invention.

FIG. 8 is a block diagram showing the organization of the functional components in an implementation of an accumulator in accordance with the operations described in table 5. In this implementation, the pixel filter has four multipliers (390, 392, 394, 396) and four adders (398, 400, 402, 404), as well as four holding registers (406, 408, 410, 412). At clocks 0–3, multiplier 390, adder 398 and holding register 406 work together as described in FIG. 7. Similarly at clocks 0–3, multiplier 392, adder 400 and holding register 408 work together; multiplier 394, adder 402 and holding register 410 work together; and multiplier 396, adder 404 and holding register 412 work together. However, at clocks 4 and 5, all of the multipliers (390, 392, 394, 396) provide their products to a single adder (398) which accumulates the output pixel component.

Table 6 demonstrates using a different multiplication order for producing three output pixels from 12 input pixels, each having two color space components, using a four-tap filter.

Figure 9:
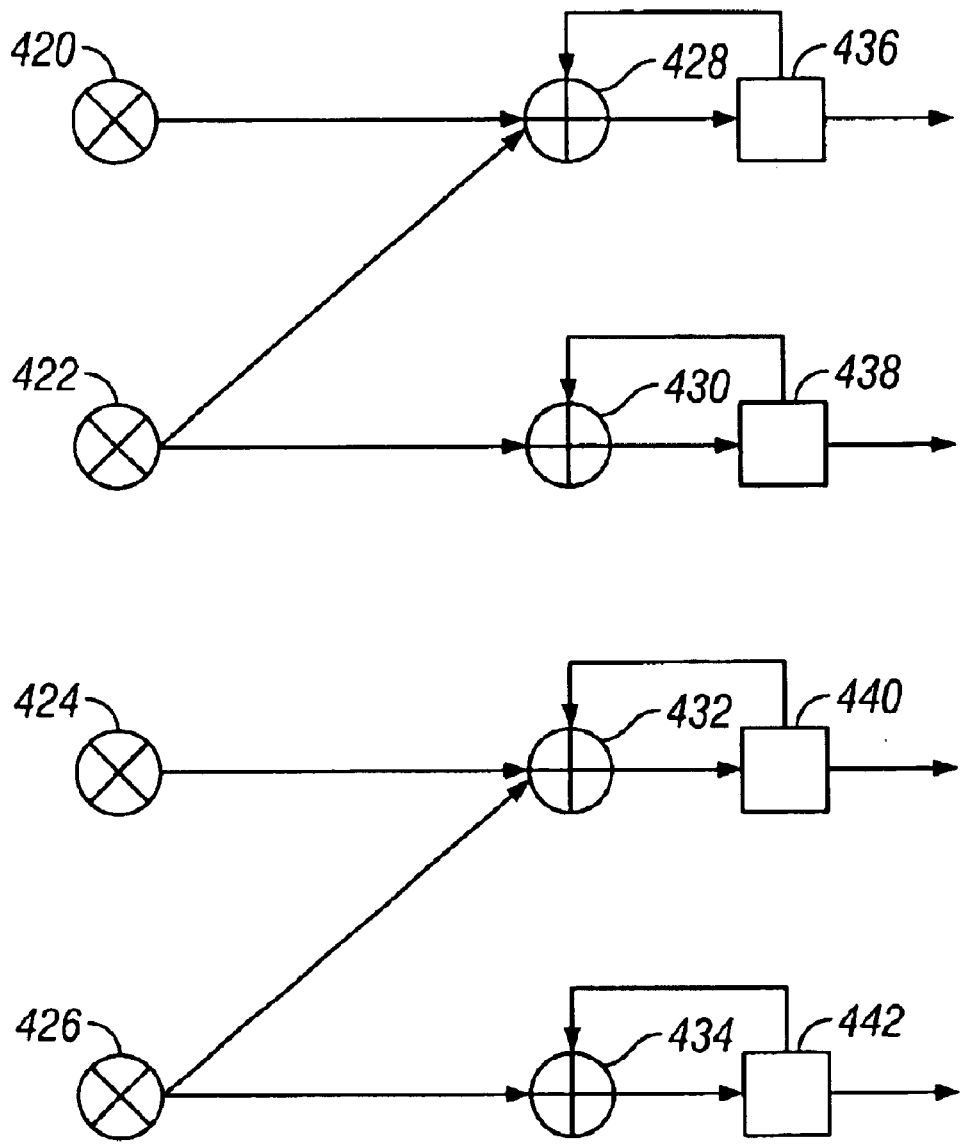
FIG. 9 is a block diagram showing the organization of the functional components in an implementation of an accumulator in accordance with a specific embodiment of the present invention.

FIG. 9 is a block diagram showing the organization of the functional components in an implementation of an accumulator in accordance with the operations described in table 6. In this implementation, the pixel filter has four multipliers (420, 422, 424, 426) and four adders (428, 430, 432, 434), as well as four holding registers (436, 438, 440, 442). At clocks 0–3, multiplier 420, adder 428 and holding register 436 work together as described in FIG. 7. Similarly at clocks 0–3, multiplier 422, adder 430 and holding register 438 work together; multiplier 424, adder 432 and holding register 440 work together; and multiplier 426, adder 434 and holding register 442 work together. However, at clocks 4 and 5, two multipliers (e.g., 420 and 422) provide their products to single adder (e.g., 428) for accumulation of an output pixel component.

TABLE 6

| Filter Clock | 0 | 1 | 2 | 3 | 4 | 5 |
|---|---|---|---|---|---|---|
| Mult 0 | Ca * Ya(0) | Cb * Yb(0) | Cc * Yc(0) | Cd * Yd(0) | Ca * Ya(2) | Cc * Yc(2) |
| Mult 1 | Ca * Ya(1) | Cb * Yb(1) | Cc * Yc(1) | Cd * Yd(1) | Cb * Yb(2) | Cd * Yd(2) |
| Mult 2 | Ka * UVa(0) | Kb * UVb(0) | Kc * UVc(0) | Kd * UVd(0) | Ka * UVa(2) | Kc * UVd(2) |
| Mult 3 | Ka * UVa(1) | Kb * UVb(1) | Kc * UVc(1) | Kd * UVd(1) | Kb * UVb(2) | Kd * UVd(2) |
| Output | | | | Yout(0) UVout(0) Yout(1) UVout(1) | | Yout(2) UVout(2) |

TABLE 7

| Filter Clock | 0 | 1 | 2 | 3 | 4 | 5 |
|---|---|---|---|---|---|---|
| Mult 0 | Ca * Ya(0) | Ka * UVa(0) | Ca * Ya(1) | Ka * UVa(1) | Ca * Ya(2) | Ka * UVa(2) |
| Mult 1 | Cb * Yb(0) | Kb * UVb(0) | Cb * Yb(1) | Kb * UVb(1) | Cb * Yb(2) | Kb * UVb(2) |
| Mult 2 | Cc * Yc(0) | Kc * UVc(0) | Cc * Yc(1) | Kc * UVd(1) | Cc * Yc(2) | Kc * UVd(2) |
| Mult 3 | Cd * Yd(0) | Kd * UVd(0) | Cd * Yd(1) | Kd * UVd(1) | Cd * Yd(2) | Kd * UVd(2) |
| Output | Yout(0) | UVout(0) | Yout(1) | UVout(1) | Yout(2) | UVout(2) |

Table 7 demonstrates still another alternative for producing three output pixels from 12 input pixels, each having two color space components, using a four-tap filter. In this example, the multiplication order has been arranged to make it look very similar to the pixel-oriented method where the filter clock is run at twice the dot clock rate. Thus, the accumulation of output pixel components is very similar to that in the pixel-oriented approach.

Figure 10:
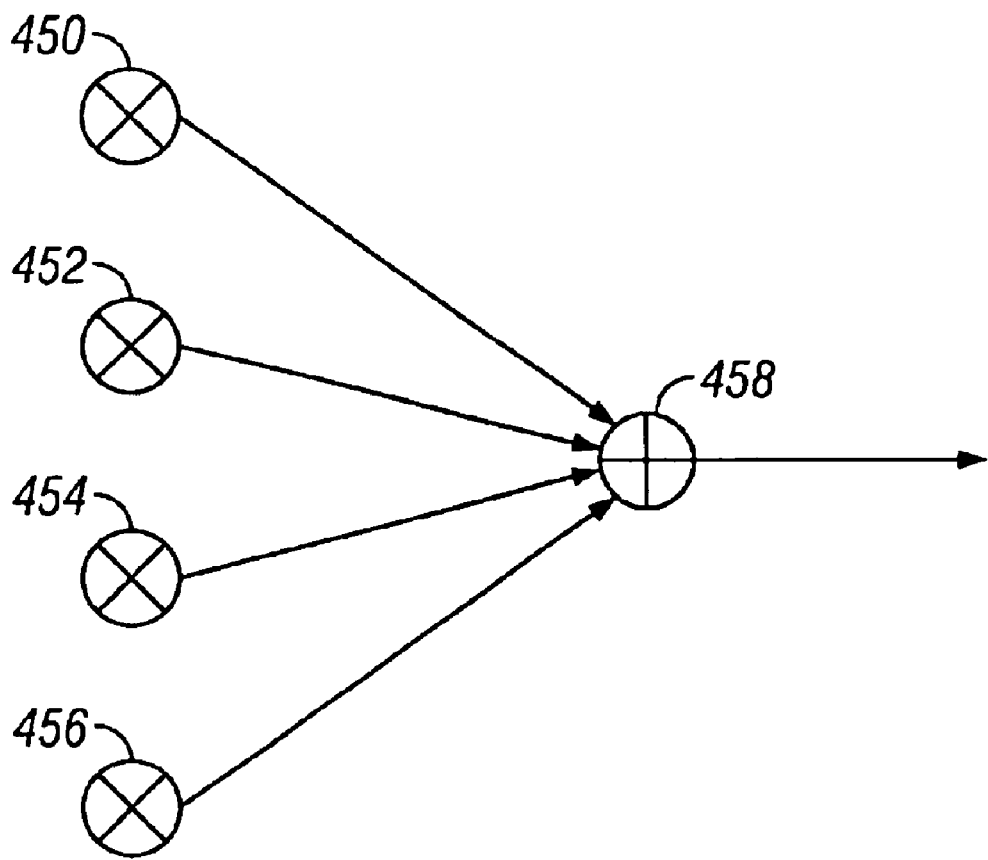
FIG. 10 is a block diagram showing the organization of the functional components in an implementation of an accumulator in accordance with a specific embodiment of the present invention.

FIG. 10 is a block diagram showing the organization of the functional components in an implementation of an accumulator in accordance with the operations described in table 7. In this implementation, the pixel filter has four multipliers (450, 452, 454, 456) and one adder (458). At each clock cycle of the pixel filter, all multipliers provide their product to the adder for accumulation of the output pixel component.

If output pixels from the accumulator are to be assembled into a frame buffer or sent to an output display device at a speed of one pixel per cycle of the dot clock, an output buffer may be required to accept the output of the accumulator. Since the accumulator provides output pixel components in blocks, the output buffer may be needed in to provide a steady supply of output pixels for assembly into frames. The buffer may also be needed when the filter clock and the dot clock do not run at the same speed, as in the example of table 7.

As compared to the pixel-oriented approach, some additional logic may be needed by a block-oriented pixel filter. First, buffering and multiplexing may be required in the line buffers in order to appropriately sort the input pixel components for the multipliers. Second, an output buffer may be needed. Also, additional adders may be required. However, though some of this additional logic is explicitly shown for clarity, it may readily be merged with other functions that are normally part of the upstream and downstream logic.

For example, use of random access memory (RAM) could replace the functionality of a line buffer including a sorter using discrete registers. In one embodiment of this scheme, the input pixel component data of the sorter is stored in a memory, such as RAM. In another embodiment, the input pixel component data may be sorted from the system frame buffer, where data in the frame buffer is to be scaled. Other embodiments of this scheme are also possible. When stored in a memory, the input pixel components can be directly addressed and provided to the-multipliers by the control logic.

It will also be apparent that the functional components of the block-oriented pixel filter may be implemented in a variety of ways. For example, they may be implemented in the form of program storage devices readable by a machine and tangibly embodying a program of instructions executable by the machine to perform the methods described herein. Such implementations may include a variety of operating systems, computing platforms, and/or computer languages. In addition, those of ordinary skill in the art will readily recognize that devices such as hardwired devices, devices relying on FPGA (field programmable gate array) or ASIC (application specific integrated circuit) technology, or the like, may also be used without departing from the scope and spirit of the inventive concepts described herein.

Regardless of how the function of providing groups of input pixel components to the multipliers is implemented in the block-oriented approach, the structure may be referred to as a sorter and the function may be referred to as sorting. Also, regardless of how the function of accumulating products from the multipliers into output pixel components is implemented, the structure may be referred to an accumulator and the process may be referred to as accumulating.

The pixel filter may be programmed by software to run in different modes. In modes requiring full processing power, the number of input pixel components in a group of input pixel components provided by the sorter to the multipliers will equal the number of multipliers. In modes where input pixels have fewer input pixel components, such as a black and white mode, the number of input pixel components in a group of input pixel components provided by the sorter to the multipliers may be less than the number of multipliers.

The block-oriented pixel filter may be employed as a component of a video display device. The video display device may include other components including, for example, a monitor.

The present invention is suitable for scaling, or resizing of video images, where the number of pixels in an input frame differs from the number of pixels in an output frame. Other image processing operations, such as color enhancement or edge enhancement, also may employ the present invention.

It should be noted that, while the examples herein utilize the YUV color space, the invention is compatible with all color space schemes. Size of the input pixels may be varied, depending upon the number of input pixel components required or desired. Also, the number of filter taps in a pixel filter may be varied without deviating from the teaching of the invention. Further, sizes of registers and memories storing the input pixel components and output pixel components may be varied.

While embodiments and applications of this invention have been shown and described, it would be apparent to those skilled in the art having the benefit of this disclosure that many more modifications than mentioned above are possible without departing from the inventive concepts herein after a review of this disclosure. The invention, therefore, is not to be restricted except in the spirit of the appended claims.

What is claimed is:

1. A block-oriented pixel filter for processing an input frame into an output frame, said pixel filter having a plurality of filter taps, said input frame comprised of a plurality of input pixels, said input pixels arranged into a plurality of input pixel sets, said input pixels each comprised of a plurality of input pixel components, said output frame comprised of a plurality of output pixels, the pixel filter comprising:

a coefficient generator for providing coefficients;

a sorter for receiving the input frame and providing groups of input pixel components selected from more than one input pixel set;

a plurality of multipliers for receiving the coefficients and the groups of input pixel components and providing products thereof, where the number of multipliers is less than the number of filter taps times the number of input pixel components in an input pixel; and an accumulator for receiving the products from the multipliers and providing output pixels.

2. The pixel filter of claim 1, further comprising:

an output buffer for receiving the output pixels and providing a steady supply of output pixels for assembly into frames.

3. The pixel filter of claim 2, where the number of input pixels in an input frame is not equal to the number of output pixels in an output frame.

4. The pixel filter of claim 1, where the coefficient generator simultaneously provides a single coefficient to the plurality of multipliers.

5. The pixel filter of claim 1, wherein the accumulator comprises a plurality of adders and the number of said plurality of adders equals the number of multipliers.

6. The pixel filter of claim 1, where the number of coefficients provided during a cycle is less than the number of filter taps times the number of input pixel components in an input pixel.

7. A block-oriented pixel filter for processing an input frame into an output frame, said pixel filter having a plurality of filter taps, said input frame comprised of a plurality of input pixels, said input pixels arranged into a plurality of input pixel sets, said input pixels each comprised of a plurality of input pixel components, said output frame comprised of a plurality of output pixels, the pixel filter comprising:

a coefficient generator for providing a number of coefficients, where the number of coefficients provided during a cycle is less than the number of filter taps times the number of input pixel components in an input pixel;

a sorter for receiving the input frame and providing groups of input pixel components selected from more than one input pixel set;

a plurality of multipliers for receiving the coefficients and the groups of input pixel components and providing products thereof; and an accumulator for receiving the products from the multipliers and providing output pixels.

8. The pixel filter of claim 7, where the number of multipliers is less than the number of filter taps times the number of input pixel components in an input pixel.

9. The pixel filter of claim 8, further comprising:

an output buffer for receiving the output pixels and providing a steady supply of output pixels for assembly into frames.

10. The pixel filter of claim 9, where the number of input pixels in an input frame is not equal to the number of output pixels in an output frame.

11. The pixel filter of claim 8, where the coefficient generator simultaneously provides a single coefficient to the plurality of multipliers.

12. The pixel filter of claim 7, further comprising:

an output buffer for receiving the output pixels and providing a steady supply of output pixels for assembly into frames.

13. The pixel filter of claim 12 where the number of input pixels in an input frame in not equal to the number of output pixels in an output frame.

14. The pixel filter of claim 7, where the coefficient generator simultaneously provides a single coefficient to the plurality of multipliers.

15. The pixel filter of claim 7, wherein the accumulator comprises a plurality of adders and the number of said plurality of adders equals the number of multipliers.

16. A method for processing an input frame into an output frame using a block-oriented pixel filter, said pixel filter having a plurality of filter taps, said input frame comprised of a plurality of input pixels, said input pixels arranged into a plurality of input pixel sets, said input pixels each comprised of a plurality of input pixel components, said output frame comprised of a plurality of output pixels, the method comprising:

receiving the input frame;

providing a number of input pixel components selected from more than one input pixel set;

generating a number of coefficients, where the number of coefficients provided during a cycle is less than the number of filter taps times the number of input pixel components in an input pixel;

multiplying each of said number of input pixel components by one of the coefficients, thereby producing products; and accumulating the products into the output pixel components.

17. The method of claim 16, further comprising:

receiving the output pixel components into an output buffer; and providing a steady supply of output pixels for assembly into frames.

18. The method of claim 16, where the number of input pixels in an input frame is not equal to the number of output pixels in an output frame.

19. The method of claim 16 where the number of input pixel components provide during the cycle is less than the number of filter taps times the number of input pixel components in an input pixel.

20. A method for processing an input frame into an output frame using a block-oriented pixel filter, said pixel filter having a plurality of filter taps, said input frame comprised of a plurality of input pixels, said input pixels arranged into a plurality of input pixel sets, said input pixels each comprised of a plurality of input pixel components, said output frame comprised of a plurality of output pixels, the method comprising:

receiving the input frame;

providing a number of input pixel components selected from more than one input set, where the number of input pixel components provided during a cycle is less than the number of filter taps times the number of input pixel components in an input pixel;

generating a number of coefficients;

multiplying each of said number of input pixel components by one of the coefficients, thereby producing products; and accumulating the products into the output pixel components.

21. The method of claim 20, where the number of coefficients generated during each cycle is less than the number of filter taps times the number of input pixel components in an input pixel.

22. The method of claim 21, further comprising:

receiving the output pixel components into an output buffer; and providing a steady supply of output pixels for assembly into frames.

23. The method of claim 21, where the number of input pixels in an input frame is not equal to the number of output pixels in an output frame.

24. The method of claim 20, further comprising:

receiving the output pixel components into an output buffer; and providing a steady supply of output pixels for assembly into frames.

25. The method of claim 20, where the number of input pixels in an input frame is not equal to the number of output pixels in an output frame.

* * * * *

UNITED STATES PATENT AND TRADEMARK OFFICE
CERTIFICATE OF CORRECTION

PATENT NO. : 6,711,301 B1
DATED : March 23, 2004
INVENTOR(S) : David Huu Tran, Maximino Vasquez and Daniel Robert Joe It is certified that error appears in the above-identified patent and that said Letters Patent is hereby corrected as shown below:

<u>Column 7,</u>
Table 3, first row labeled "Filter clock", replace "1" with -- 0 --.
Table 3, first row labeled "Filter clock", replace "2" with -- 1 --.
Table 3, first row labeled "Filter clock", replace "3" with -- 2 --.

Signed and Sealed this

Thirty-first Day of August, 2004

JON W. DUDAS
*Director of the United States Patent and Trademark Office*